United States Patent
Alsobrook et al.

(10) Patent No.: US 7,060,312 B2
(45) Date of Patent: Jun. 13, 2006

(54) METHODS AND APPARATUS FOR PROCESSING VEGETABLES

(75) Inventors: J. Kevin Alsobrook, Yuma, AZ (US); R. Kent Addison, Salinas, CA (US); James Aikins, Modesto, CA (US); Antonio Cicchino, Yuma, AZ (US)

(73) Assignee: Fresh Innovations, LLC, Yuma, AZ (US)

( * ) Notice: Subject to any disclaimer, the term of this patent is extended or adjusted under 35 U.S.C. 154(b) by 43 days.

(21) Appl. No.: 10/777,667

(22) Filed: Feb. 10, 2004

(65) Prior Publication Data

US 2005/0053706 A1  Mar. 10, 2005

Related U.S. Application Data

(60) Provisional application No. 60/500,441, filed on Sep. 5, 2003.

(51) Int. Cl.
    *A23N 15/04*  (2006.01)
(52) U.S. Cl. ............... 426/481; 426/482; 426/392; 426/105; 426/518; 426/615
(58) Field of Classification Search ............... 426/481, 426/482, 392, 106, 518, 615
    See application file for complete search history.

(56) References Cited

U.S. PATENT DOCUMENTS

| | | | |
|---|---|---|---|
| 858,094 A | 6/1907 | Monte | |
| 3,602,279 A * | 8/1971 | Van Raaij | 99/584 |
| 3,636,999 A * | 1/1972 | Cordes | 99/636 |
| 3,734,004 A * | 5/1973 | Losito | 99/637 |
| 3,989,110 A | 11/1976 | Medlock et al. | |
| 4,068,011 A | 1/1978 | Green et al. | |
| 4,141,201 A | 2/1979 | Christensen | |
| 4,202,261 A | 5/1980 | Lawson | |
| 4,236,581 A | 12/1980 | Beckett | |
| 4,244,252 A | 1/1981 | Pellaton | |
| 4,258,618 A | 3/1981 | Lawson | |
| 4,361,084 A | 11/1982 | Raatz | |
| 4,430,933 A | 2/1984 | Boots | |
| 4,450,762 A | 5/1984 | Lustig | |
| 4,457,224 A | 7/1984 | Kino | |
| 4,481,875 A | 11/1984 | Toyosato | |
| 4,524,681 A | 6/1985 | Harris et al. | |
| 4,585,073 A | 4/1986 | Mayeda et al. | |
| 4,602,559 A | 7/1986 | Suzuki et al. | |
| 4,629,005 A | 12/1986 | Hood, Jr. et al. | |
| 4,658,713 A | 4/1987 | Nagaoka | |
| 4,660,653 A | 4/1987 | Mayeda et al. | |
| 4,718,334 A | 1/1988 | Nagaoka | |

(Continued)

FOREIGN PATENT DOCUMENTS

DE         4218210 A1 * 12/1993

(Continued)

OTHER PUBLICATIONS http://www.cfic.ca/viewarticle.asp?id=2&article=14&lang=english□□Apr. 1, 2002.*

*Primary Examiner*—Milton I. Cano
(74) *Attorney, Agent, or Firm*—Duckor Spradling Metzger & Wynne; Bernard L. Kleinke

(57) ABSTRACT

The disclosed embodiments include methods and apparatus for processing vegetables having a root crown including applying opposing forces to the vegetables to separate the roots or portions thereof at or near the root crown from the vegetable, and packaging the vegetables in a container.

21 Claims, 3 Drawing Sheets

U.S. PATENT DOCUMENTS

| | | | |
|---|---|---|---|
| 4,753,296 A * | 6/1988 | Kruithoff | 171/26 |
| 4,792,455 A | 12/1988 | Tallafus | |
| 5,000,087 A | 3/1991 | Nagaoka | |
| 5,225,233 A | 7/1993 | Komatsu et al. | |
| 5,316,778 A | 5/1994 | Hougham | |
| 5,437,886 A | 8/1995 | Atkins et al. | |
| 5,518,747 A | 5/1996 | Pike, Jr. | |
| 5,750,171 A | 5/1998 | Shuknecht | |
| 6,053,098 A | 4/2000 | Yamamoto | |
| 6,413,566 B1 | 7/2002 | Caridis et al. | |
| 6,419,028 B1 | 7/2002 | Provitola | |
| 6,443,234 B1 | 9/2002 | Raymond | |
| 6,484,810 B1 | 11/2002 | Bendix et al. | |

FOREIGN PATENT DOCUMENTS

| | | | |
|---|---|---|---|
| FR | 2747273 A1 | * | 10/1997 |
| JP | 04053477 A | * | 2/1992 |
| JP | 09037626 A | * | 2/1997 |

* cited by examiner

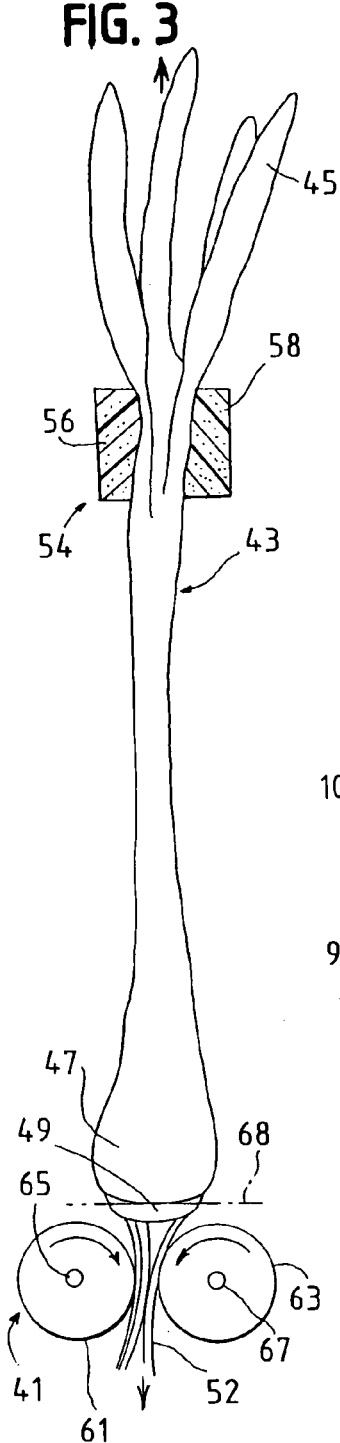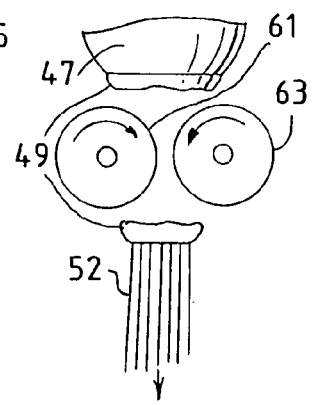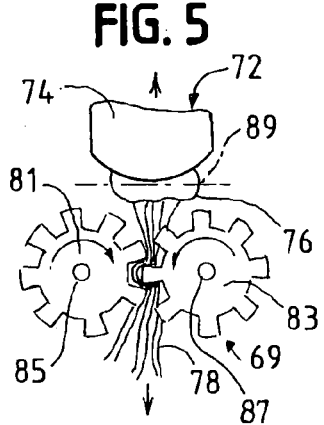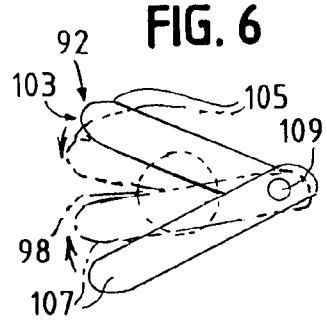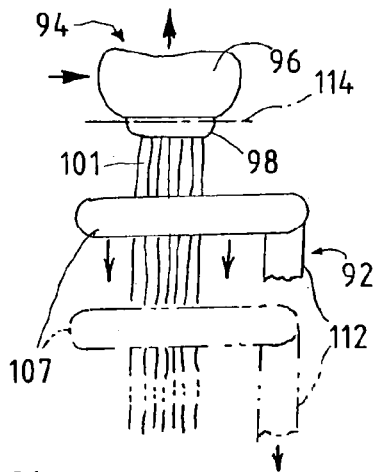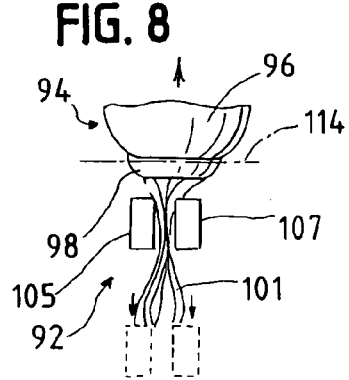

METHODS AND APPARATUS FOR PROCESSING VEGETABLES

BACKGROUND OF THE INVENTION

1. Field of the Invention

The present invention relates in general to a methods and apparatus for processing vegetables, and more particularly it relates to methods and apparatus for removing roots from vegetables having a root crown or multiple root structure, such as green onions and others.

2. Background Art

There is no admission that the background art disclosed in this section legally constitutes prior art.

Various vegetables such as vegetables having multiple root structures are frequently processed after harvesting them. For example, the processing of green onions includes the cutting off, using cutting blades, of a portion of the roots of the vegetable prior to packaging.

All too frequently, the root crown is inadvertently cut entirely off from the remaining structure of the vegetable. The vegetable can then continue to grow and cause an unwanted telescoping growth at the exposed bottom of the bulb of the vegetable.

BRIEF DESCRIPTION OF THE DRAWINGS

The following is a brief description of the drawings:

FIG. 3 is a diagrammatic elevational view of an embodiment of a root removal apparatus useful in the method of FIG. 1;

FIG. 4 is a diagrammatic elevational fragmentary view of the apparatus of FIG. 3, illustrating it in another position;

FIG. 5 is a fragmentary diagrammatic elevational view of another embodiment of a root removal apparatus useful in the method of FIG. 1;

FIG. 6 is a diagrammatic plan view of yet another embodiment of a root removal apparatus useful in the method of FIG. 1;

FIG. 7 is a side elevational view of the apparatus of FIG. 6; and

FIG. 8 is a front elevational view of the apparatus of FIG. 6.

DETAILED DESCRIPTION OF CERTAIN EMBODIMENTS OF THE INVENTION

According to a disclosed embodiment of the present invention, there is provided methods and apparatus for processing vegetables having a root crown including applying opposing forces to the vegetables to separate the roots or portions thereof at or near the root crown from the vegetable, and packaging the vegetables in a container.

By separating the roots or portions thereof at the root crown from the vegetables, the remaining portion of the root crown attached to the bottom of the bulb of the vegetable, prevents or at least greatly tends to eliminate the unwanted telescoping growth of the vegetable after the roots are removed. According to the disclosed embodiments of the present invention, the method and apparatus as disclosed herein may help to prevent or to inhibit such unwanted growth for some applications, and thus may promote longer shelf life of the packaged vegetables.

Figure 1:
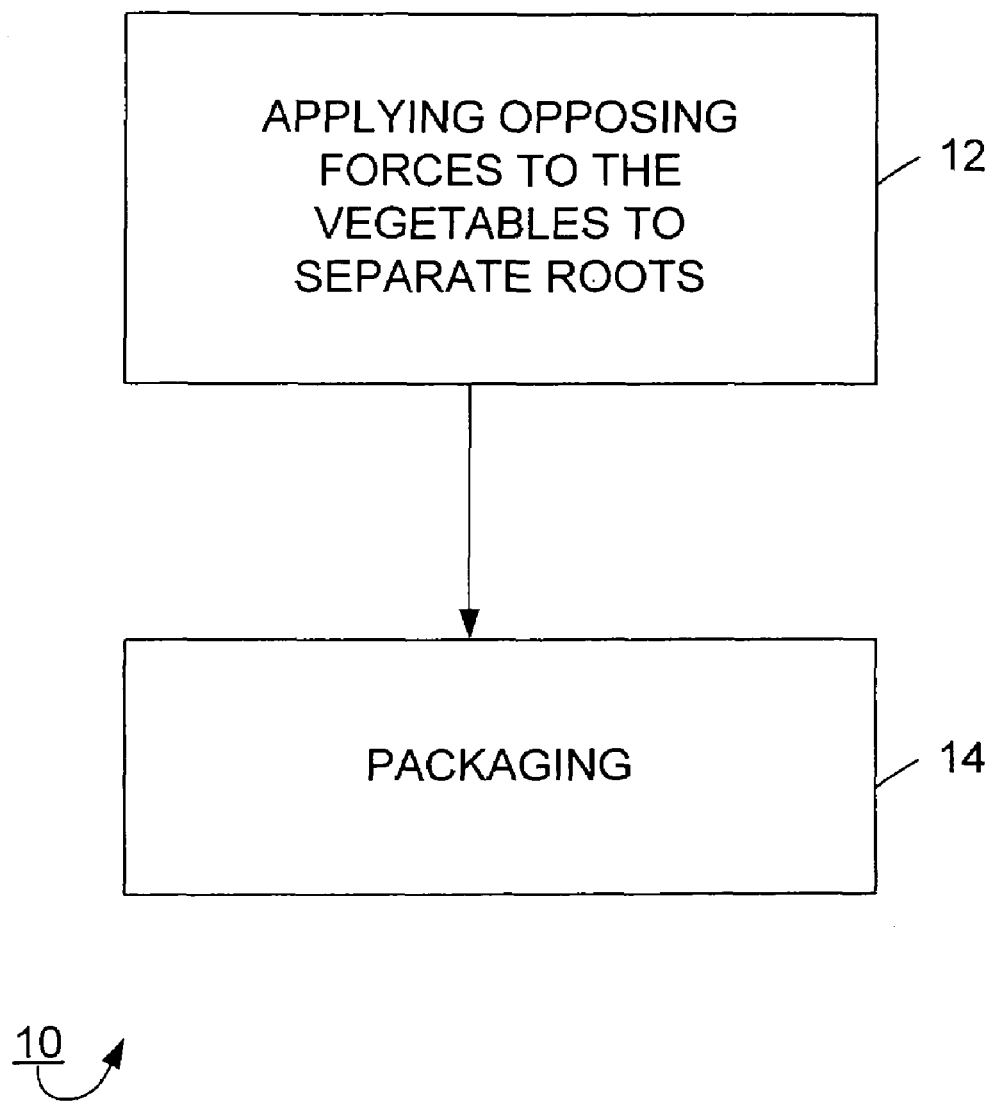
FIGS. 1 and 2 are flow chart diagrams illustrating a method of an embodiment of the invention.

Referring now to the drawings, and more particularly FIG. 1 thereof, there is illustrated an embodiment of a vegetable processing method generally indicated at 10. The method 10 includes, as indicated at box 12, applying opposing forces to the vegetables to separate the roots at the root crown from the remaining portion of the vegetable structure. In so doing, the opposed forces tend to pull apart or otherwise take apart the root crown. The remaining portion of the root crown tends to prevent the unwanted telescoping of the vegetable. If the root crown is not able to be pulled apart, the roots tend to break apart or be torn off, leaving the entire root crown intact to serve to help protect against the undesirable telescoping effect.

The applying of the opposing forces includes applying force to the bottom portion of each one of the vegetables below the intersection of the root crown and the bulb in opposition to force applied to the top portion of the vegetable. As a result, the bottom portion is separated from the vegetable at the root crown. The bottom portion may include a broken off portion of the root crown with all of the root attached thereto, or may include torn off portions of the roots only. In this manner, the remaining portion of the root crown stays in tact with the vegetable to prevent or inhibit unwanted telescoping growth.

As indicated at box 14, the de-rooted vegetables are then grouped together and packaged. The packaged products are typically then transported to where they are to be sold.

Figure 2:
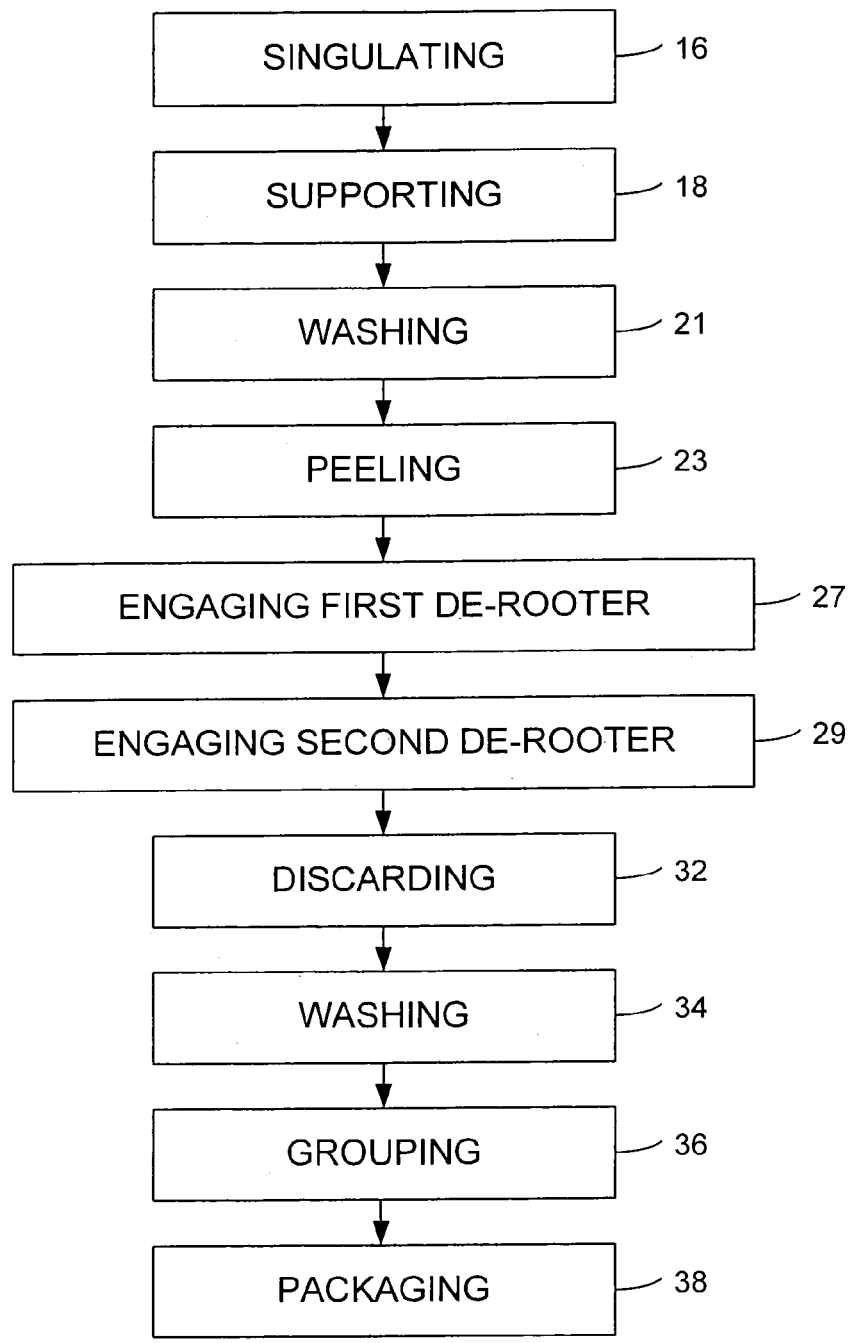

Considering now one embodiment of the method 10 with reference to FIG. 2, the vegetables such as green onions are first singulated as indicated at box 16. The singulated vegetables are then supported from their upper portion individually as indicated at box 18 to be suspended vertically. For purposes of this description of an example of the disclosed embodiment, assume that the vegetable being processed is a green onion. Also, while a vertical disposition is described herein, other dispositions may also be employed such as horizontal or angular.

The vertically supported vegetables are then washed as indicated at box 21. In this regard, the vertically supported green onions are transported past a washing station. The foreskins are then peeled from the green onions as they are moved past a peeling station as indicated at box 23.

As indicated at box 27, the roots of the peeled green onions are each then moved seriatim into engagement with a first de-rooter such as a pair of rotating members. The de-rooter provides a downward force on the roots of the green onions in opposition to the force applied at the upper portion of the green onion for supporting it in a vertical hanging disposition. The opposing forces cause the roots to be separated from the remaining structure of the green onion at the root crown. In this regard, the root crown either is ripped apart or otherwise becomes separated, or the bottom portions of the roots are torn off leaving the root crown intact. Thus, either all or a substantial portion of the green onions being processed have their roots either removed entirely or a substantial portion of the roots are torn away, to leave either all or a substantial portion of the root crown intact to prevent or at least to inhibit the unwanted telescoping growth.

The green onions are then moved into engagement with a second de-rooter such as a pair of rotating members as indicated at box 29 so that in the event that the roots have not been removed, they will undergo a second de-rooting operation similar to the method described in connection with the first de-rooter as indicated at box 27.

The separated portions of the green onions are then discarded as indicated at box 32. The de-rooted green onions are then transported to a washing station for washing them as indicated at box 34. The washed green onions are then grouped as indicated at box 36, and the groups of green onions are then packaged as indicated at box 38.

Referring now to FIGS. 3 and 4 of the drawings, there is shown a de-rooter 41, which is constructed in accordance with an embodiment of the invention, and which may be used in connection with the method of FIG. 1. The de-rooter 41 is used to remove the roots from a series of green onions such as a green onion 43 as they are being transported seriatim to and past the de-rooter 41. The green onion 43 includes a stalk or tube 45 at the upper portion thereof and a bulb 47 having a root crown 49 with roots 52 extending from the bottom portion of the green onion 43.

A clamp such as a foam clamp 54 in the form of a foam conveyor belt may be used to support the green onion 43 by clamping the stalk 45 to permit it to hang vertically from the clamp 54. The foam clamp 54 includes a pair of foam clamp members or belts 56 and 58 which grips and holds opposite sides of the stalk 45 to support the onion 43 in a generally vertical disposition as it is moved to and past the de-rooter 41. The conveyor clamp 54 translates the green onion 43 to the rotating de-rooter 41 for root removal on the fly. The de-rooter 41 includes a pair of rotating members in the form of pinch rollers 61 and 63 mounted for rotation about the respective horizontal axes 65 and 67. In this regard, the rollers 61 and 63 are driven about their respective horizontal axes in opposite directions.

The roots 52 are moved into engagement between the closely spaced rollers 61 and 63, which pull downwardly on the roots 52 to provide an opposing force relative to the force applied by the clamp 54. The opposing forces may separate or rip apart the root crown 49 as indicated in FIG. 4. Alternatively, if the root crown 49 does not fracture, the roots 52 may tear apart under the opposing longitudinal forces, thus providing roots of a shorter length without removing any portion of the root crown. The separated portion of the root crown 49 and the roots 52, or just the torn off portions of the roots, are discharged downwardly from the rotating pinch rollers 61 and 63 and fall under the force of gravity for discarding them.

Referring now to FIG. 5, there is shown another de-rooter 69, which is constructed in accordance with another embodiment of the invention and which is also useful in connection with the method 10 of FIG. 1. The de-rooter 69 is similar to the de-rooter 41, except that the de-rooter 69 does not include rollers.

The de-rooter 69 facilitates the removal of roots from green onions such as a green onion 72 having a bulb 74 with a root crown 76 having roots 78. The de-rooter 69 includes, instead of a pair of pinch rollers, a pair of rotating members in the form of meshing gears such as the spur gears 81 and 83 mounted for rotation about the respective horizontal axes 85 and 87. One of the meshing gears is a driving gear, and the other gear is a driven gear. The driving gear is activated by a suitable motive device (not shown), such as a motor.

The meshing gears 81 and 83 engage the roots 78 in a similar manner as the pinch rollers 61 and 63 of FIG. 3. Thus, the meshing gears 81 and 83 forcibly pull on the roots 78 downwardly in opposition to the force applied to the upper portion (not shown) of the green onion 72 to cause the roots 78 to separate from the remaining structure of the green onion 72 at the root crown 76 along a separation line 89.

Referring now to FIGS. 6, 7 and 8, there is shown a de-rooter 92, which is constructed in accordance with still another embodiment of the invention, and which is suitable for use with the method 10 of FIG. 1. The de-rooter 92 may be used in connection with green onions such as a green onion 94 having a bulb 96 with a root crown 98 and roots 101. The de-rooter 92 includes a moveable clamp such as an articulated horizontal V-shaped clamp 103 having a pair of clamp members 105 and 107 are pivotally mounted together at a vertical axis 109. The roots 101 of the green onion 94 are moved into engagement with the V-shaped clamp 103, and in so doing, the clamp members 105 and 107 move pivotally toward one another to grasp the roots 101 therebetween. Once clamped in place as indicated by the phantom lines shown in FIG. 6 and in solid lines in FIG. 8, a vertically movable support 112 (FIG. 7) abruptly moves the clamp 103 vertically downwardly to apply an abrupt jarring force in opposition to the force applied at the upper portion of the green onion 94 being held in a manner similar to the clamp 54 of FIG. 3. The movement of the support post 112 causes the clamp 103 to move abruptly downwardly by means (not shown) such as a piston cylinder assembly (not shown), as indicated in broken lines in FIGS. 7 and 8, thereby causing the root crown 98 preferably to be pulled apart and to separate along a separation line 114. Alternatively, in the event that the root crown 98 does not fracture, the bottom portions of the roots 101 are ripped away at the clamp 103.

The term "singulated" as used herein may mean "singled out," and "singulating" may mean "one at a time."

Further modifications will also occur to those skilled in this art, and such are considered to fall within the spirit and scope of the invention as defined in the appended claims.

What is claimed is:

1. A method of processing green onions having bulbs including root crowns comprising: securing a top portion of each of the green onions; moving the secured green onions in a generally vertical disposition into engagement with a pair of like sized reversely rotating members; driving the rotating members sufficiently to apply an abrupt jarring force to a bottom portion of each of the green onions acting substantially in the direction opposite the top portion and in line between the top and bottom portions of each one of the green onions to rip apart a root crown to separate a bottom portion only of the root crown from the remaining portion of each green onion upon engaging the rotating members; and packaging the green onions in a container.

2. A method according to claim 1, wherein said applying force includes applying force to the bottom portion of each one of the green onions below the intersection of the root crown and the bulb in the opposite direction to the top portion of the green onion to rip apart the root crown from the bottom portion of the green onion.

3. A method according to claim 1, further including discarding the separated portions of the green onions.

4. A method according to claim 1, further including discarding the separated portions of the green onions.

5. A method according to claim 1, further including singulating a group of the green onions prior to the applying of force.

6. A method according to claim 5, further including washing the singulated green onions.

7. A method according to claim 6, further including peeling the foreskins from the singulated green onions.

8. A method according to claim 7, further including supporting the singulated green onion vertically by its stalk.

9. A method according to claim 8, further including translating the green onions along a path of travel.

10. A method according to claim 1, further including translating the green onions substantially vertically along a path of travel into engagement with a de-rooter to apply force to the bottom portion of the green onion.

11. A method according to claim 10, further including translating the green onions to a second de-rooter to repeat the applying of force to the bottom portion of the green onions.

12. A method according to claim 10, wherein the applying of force is caused by holding the top portion of the green onion while the de-rooter applies force to the bottom portion of the green onion.

13. A method according to claim 12, further including washing the green onions after separating the bottom portion therefrom.

14. A method according to claim 13, further including grouping the green onions.

15. A method according to claim 10, wherein the rotating members include a pair of pinch rollers.

16. A method according to claim 10, wherein the rotating members include a pair of meshing gears.

17. A method according to claim 1, further including subsequently repeating the applying the abrupt jarring force acting substantially in the direction opposite the top portion and in line between the top and bottom portions of each one of the green onions to help ensure the ripping apart of the root crowns from the remaining portion of each green onion.

18. A method according to claim 1, wherein the driving the rotating members sufficiently to apply the abrupt jarring force includes holding the green onions individually by the top portions thereof moving them seriatim to a de-rooting station, and applying the abrupt jarring force to the bottom portion of each green onion in the direction opposite to the top portion of each green onion upon engaging the rotating members.

19. A method of processing green onions having bulbs including moving the secured green onions in a generally vertical disposition into engagement with a pair of like sized reversely rotating members; driving the rotating members sufficiently to apply an abrupt jarring force to a bottom portion of each of the green onions acting substantially in the direction opposite the top portion and in line between the top and bottom portions of each one of the green onions to rip apart a rot crown to separate a bottom portion only of the root crown from the remaining portion of each green onion upon engaging the rotating members.

20. A method of processing green onions having bulbs including root crowns comprising: securing a top portion of each of the green onions; moving the secured green onions in a generally vertical disposition; engaging the secured green onions with a vertically movable clamp; driving the clamp sufficiently to apply an abrupt jarring force using the vertically movable clamp to a bottom portion of each of the green onions acting substantially in the direction opposite the top portion and in line between the top and bottom portions of each one of the green onions to rip apart a root crown to separate a bottom portion only of the root crown from the remaining portion of each green onion; and packaging the green onions in a container, wherein the green onions are secured by the top portion at the time of applying the abrupt jarring force in a downward direction, the green onions are transported to the clamp in a direction generally perpendicular to a path of travel of the clamp.

21. A method of processing green onions having bulbs including root crowns comprising: securing a top portion of each of the green onions; moving the secured green onions in a generally vertical disposition into engagement with a pair of like sized reversely rotating members; driving the rotating members sufficiently to apply an abrupt jarring force to a bottom portion of each of the green onions acting substantially in the direction opposite the top portion and in line between the top and bottom portions of each one of the green onions to rip apart a root crown to separate a bottom portion only of the root crown from the remaining portion of each green onion as soon upon engaging the rotating members; wherein the green onions are secured by the top portion at the time of applying the abrupt jarring force, the green onions are transported to the rotating members in a direction generally perpendicular to an axis of each of the rotating members.

* * * * *

UNITED STATES PATENT AND TRADEMARK OFFICE
CERTIFICATE OF CORRECTION

PATENT NO.         : 7,060,312 B2
APPLICATION NO. : 10/777667
DATED              : June 13, 2006
INVENTOR(S)        : J. Kevin Alsobrook et al.

It is certified that error appears in the above-identified patent and that said Letters Patent is hereby corrected as shown below:

Claim 19, column 6, line 1, delete "apart a rot crown to separate a bottom portion only of the" insert -- apart a root crown to separate a bottom portion only of the --

Signed and Sealed this

Fifteenth Day of August, 2006

JON W. DUDAS
*Director of the United States Patent and Trademark Office*